June 12, 1962 W. H. BRADY, JR 3,038,597

MULTIPLE MANIPULATION BACKING-BOARD-MOUNTED ADHESIVE TAPE

Filed Feb. 13, 1959 2 Sheets-Sheet 1

INVENTOR
WILLIAM H. BRADY, JR.

BY Roger Sherman Hoar

ATTORNEY

INVENTOR
WILLIAM H. BRADY, JR.

BY Roger Sherman Hoar

ATTORNEY

1

3,038,597
MULTIPLE MANIPULATION BACKING-BOARD-MOUNTED ADHESIVE TAPE
William H. Brady, Jr., 2906 E. Linnwood Ave., Milwaukee, Wis.
Filed Feb. 13, 1959, Ser. No. 793,200
3 Claims. (Cl. 206—56)

This invention relates to backing-board-mounted adhesive tape; and resides more particularly in an improved combination comprising a portion or portions of pressure-sensitive tape, adherently attached to a backing-board composed of a thin layer of laminar concreted material having a limited susceptibility to splitting parallel to its faces, and having extending beneath the tape and alternating on opposite faces of the board, at least three closely associated parallel linear scores, between which the board can be cleanly separated by a tearing motion to release a portion of the board so that removal of the tape will be facilitated.

Pliant sheet material coated with permanently tacky eucohesive adhesive, requiring no solvent to activate the same, is commonly called "pressure sensitive adhesive tape." For convenience such materials are herein called "adhesive tape." And, although the present invention is primarily applicable to tape in ribbon form, made of woven material such as surgeon's tape or electrical friction tape, the term "tape" herein is intended to include generically labels and tape of other shapes and materials. Similarly, the term "backing-board" herein is intended to include generically a card, sufficiently stiff to conveniently support the tape, and having a smooth facing which will not part from the backing-board nor impair the adhesive coating of the tape, and from which the tape can be readily peeled. More specifically, the backing-board should have certain other characteristics which will be explained as the description progresses.

Heretofore series of separable portions of adhesive tape have been mounted side-by-side on backing-boards for successive removal therefrom. But starting the removal of each piece of tape has been difficult, especially when the pieces of tape extend flush to the edges of the backing-board. Picking at the edge of the tape with one's fingernails has proved time-consuming and annoying. Even the use of a knife or other sharp-pointed tool for lifting the edge of the tape has likewise proved time-consuming and annoying. Accordingly, there was adopted the expedient of a severable marginal portion of the mounting-backing-board, underlying the ends of the pieces of tape which portion can be severed and then peeled-off to expose said ends so that the same may be grasped for removal, as exemplified in U.S. Patents No. 2,434,545 and No. 2,681,732. These patents exemplify the feature of scoring the backing-board along the line of severance, to facilitate cleavage. The first patent showed a single scoring. The second patent showed the improvement of two slightly staggered scorings, one on each face of the backing-board, reasons for which are fully set forth therein. Although it is true that the use of two scorings has been highly satisfactory in reducing the drawbacks inherent in a single scoring, it has been found in practice that some users do not obtain the clean tears, readily obtainable by others; the backing resists tearing, and when it does tear, the severance is not limited to the interior portions of the board, but instead feathers the surface.

Accordingly, the principal objects of the present invention are: first, to discover the reason for this apparent idiosyncrasy; and secondly, to remedy the difficulty. In other words, it is an object of the present invention to provide an improved backing-board-mounted adhesive tape combination that better induces severance of the

2 backing-board within the interior portions of the board substantially in alignment with the run of the preponderant grain direction without intersecting or meeting exterior surfaces of the board.

Other objects and advantages of the invention will appear in the description which follows.

In the description, reference is made to the accompanying drawings, forming a part hereof, in which there are shown, by way of illustration and not of limitation, certain specific forms in which the article of manufacture of the present invention may be embodied.

In the drawings:

FIG. 1 is a plan view of the backed adhesive tape of the present invention, with the face which constitutes the tape turned toward the observer. A portion of the tape is shown cut away, to expose an indication of the triple transverse scoring of the present invention.

FIG. 2 is a greatly enlarged cross-section of a portion of the backed tape, seen from the left, as though cut along the line 2—2 of FIG. 1. One of the three transverse scores is on that face of the backing-board adjacent the tape. The other two scores are on the further face of the backing-board.

Figure 2:
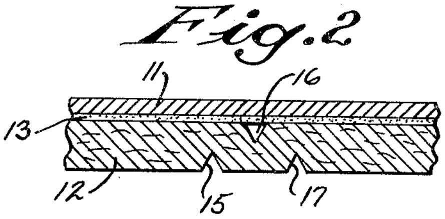
Figure 3:
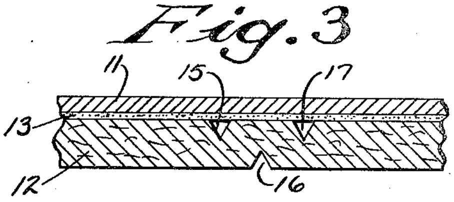
FIG. 3 is similar to 2, but with two scores on the adjacent side, and one score on the further side.

Each of FIGS. 7 to 14 inclusive is a greatly enlarged cross-section of a portion of backed tape, some two-scored and some three-scored, all taken in the same position as FIGS. 2 and 3, but all showing the backed tape in the course of attempted severing of the backing-board, by attempted tearing in the direction of the arrows.

Figure 7:
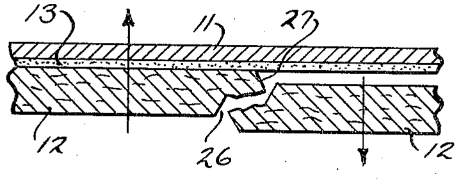

In more detail:

FIG. 7 shows two-scored backing-board in the course of successful tearing.

Figure 8:
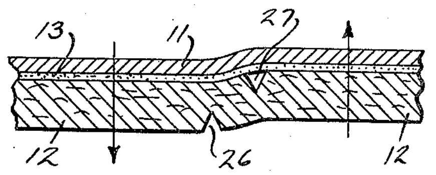

FIG. 8 shows the same backing-board in the course of unsuccessful tearing.

Figure 9:
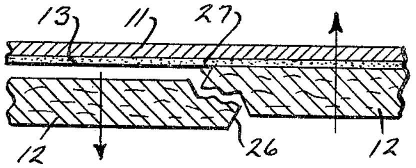

FIG. 9 shows two-scored backing-board in the course of successful tearing.

Figure 10:
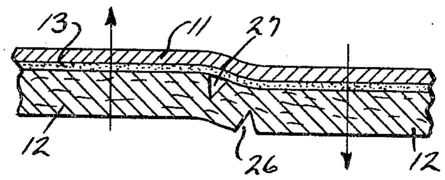

FIG. 10 shows the same backing-board in the course of unsuccessful tearing.

Figure 11:
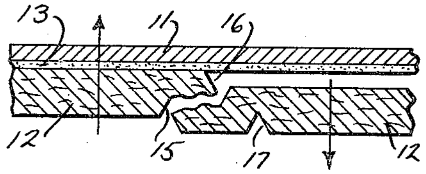

FIG. 11 corresponds to FIG. 7, but shows three-scored backing-board being successfully torn by the same tearing motion.

Figure 12:
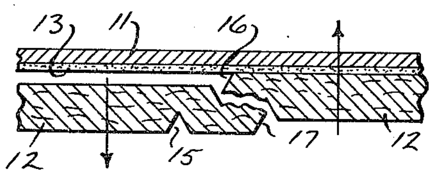

FIG. 12 corresponds to FIG. 8, but shows three-scored backing-board being successfully torn by the same tearing motion.

Figure 13:
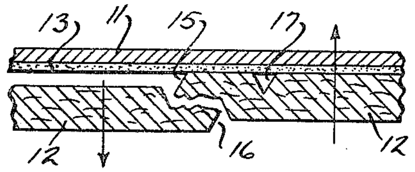

FIG. 13 corresponds to FIG. 9, but shows three-scored backing-board being successfully torn by the same tearing motion.

Figure 14:
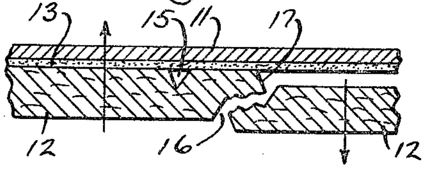

FIG. 14 corresponds to FIG. 10, but shows three-scored backing-board being successfully torn by the same tearing motion.

Throughout the description, the same reference numeral is applied to the same member or similar members.

Figure 1:
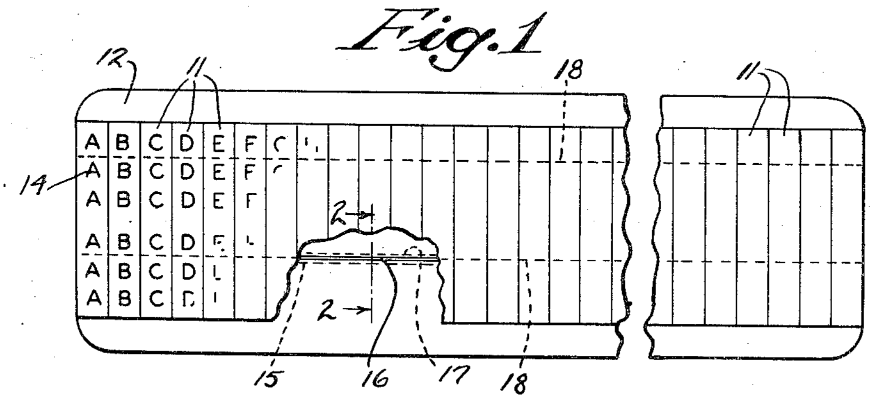

Referring now to the drawings, and more particularly FIGS. 1 and 2, it will be seen that 11 indicates each of a plurality of dispensably mounted adhesive tape portions arranged in a row and mounted on a cardlike backing-board 12. These tape portions, as shown are intended for use as identification labels such as are employed for marking electric wiring and the like. It is contemplated, however, that the tape portions may be of any configuration and size desired, and may be adapted for any suitable use or purpose, such as masks, ornaments, dial faces, closures, and others. Two such variants will be referred to hereinafter.

Each of the labels 11 comprises a thin layer of pliant sheet material, composed of any suitable material, such as paper, fabric, or composition, having sufficient strength to withstand peeling of the adhesive 13 from the board 12. Fabric, such as employed in surgeon's tape, is preferred. On the upper face of each of the labels 11, there may be printed marking indica 14, suitable for the intended use; and upon the lower face of each label 11, is spread a layer of eucohesive pressure-sensitive permanently-tacky adhesive 13, which adheres without need for moistening with water or other solvent. The adhesive 13 is disposed in facing relationship with the board 12 and acts to hold each of the labels 11 to the board 12 until removed for use. While the labels 11 adhere to the board 12 the adhesive 13 is protected from contact with the atmosphere and with foreign objects and the board 12 by reason of its stiffness maintains the surface of the labels 11 in an unwrinkled condition. Margin areas of the board 12, extending beyond the margin of the labels 11, enhance the protection afforded. The board 12 thus constitutes a protective package in which the printed marking indicia 14 are prominently displayed for ready inspection by the user.

It is preferred that the mounting board 12 be formed of a firm, stiff, resilient material of sufficient thickness to retain its shape and to resist bending during the usual course of handling. The board 12 should have the further quality of not peeling away in a thin layer from the surface thereof, upon a label 11 being removed therefrom, which feathering may mask the adhesive. A further desirable property is that of slightly greater strengths in all directions other than directly across the thickness of the board so that a small but perceptable delaminating tendency is exhibited.

In other words, tensile strength in the direction of the grain is relatively large as compared with resistance to shear aligned with the grain or to tensile strength normal to the grain. As a result a splitting or severance running with the grain may be accomplished with a small force if the area of splitting is small.

Materials which have the above properties and which are therefore suitable substances for use as mounting boards for the labels 11, are herein termed laminar concreted materials. By the term laminar concreted it is meant properties within the material are such that relative movement between the internal component constituents that comprise the makeup of the material is strongly except for a slight delaminating tendency. Cemented felted fibrous material such as vulcanized fibre or resin bonded pulp are examples of laminar concreted material as the term is herein employed.

Extending across the board 12, are three scorings or lines of indentations 15, 16 and 17, of a depth approximately one-half the thickness of the board, offset slightly from each other, an amount preferably of approximately 1 to 3 times the thickness of the board. A greater offset would strengthen the board, but would increase the possibility of not having a clean severance when tearing as hereinafter described, whereas a lesser offset would unduly weaken the board. It is contemplated that greater or lesser offsets may be employed in special embodiments of the invention.

In FIG. 2, representing the preferred embodiment of the invention, one of the three scorings is on the face of the board adjacent the tape, and the other two scorings are on the further face of the board. In FIG. 3, the opposite is true.

Although no advantage would accrue, more than three scorings could be employed without departing from the scope of the invention.

In some of the drawings, a single line is employed to indicate a set of a plurality of scorings collectively.

More than one set of scorings may be employed, so that the board is severable selectively in a plurality of places.

Figure 6:
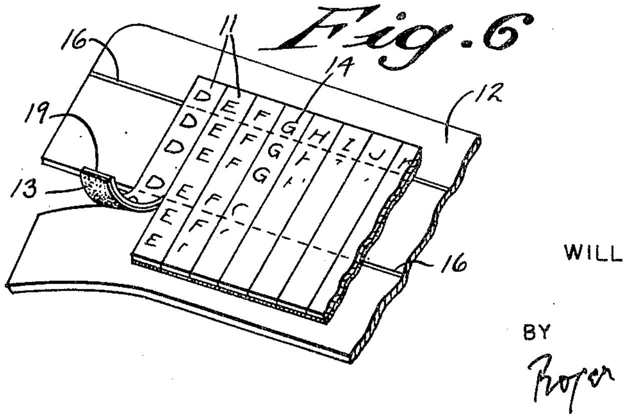
FIG. 6 is an isometric perspective view of the variant of FIG. 1, with several of the strips of tape removed, the severable portion of the backing-board partly severed, and one strip of tape in the process of being removed.

Severance is accomplished by grasping one end of the board between one thumb and forefinger on one side of a set of scorings, and with the other thumb and forefinger on the other side, and then pulling up with one hand and down with the other. A splitting severance along the grain is thereby induced, and is confined within the zone between two adjacent scorings, as will appear more clearly in the discussion of FIGS. 11 to 14 hereinafter. This frees the end 19 of one of the tapes 11, as shown in FIG. 6. This enables this piece of tape to be conveniently peeled off.

Figure 4:
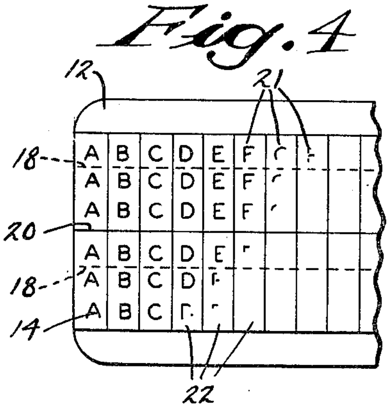
FIG. 4 is a plan view of a second variant of the backed adhesive tape of the present invention, differing from FIG. 1 in that the pieces of tape are divided in two by a transverse cut.

FIG. 4 shows a combination identical to that of FIGS. 1, 2, and 6, except that in FIG. 4 the former tapes 11 have now been divided by cut 20 into two sets of tapes 21 and 22.

Figure 5:
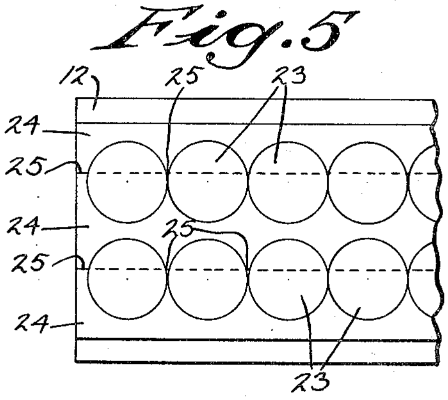
FIG. 5 is a plan view of a third variant, in which the tape is cut into small circular pieces.

In the variant of FIG. 5 the tape is a sheet, divided into individual tapes 23 of circular shape, the balance of the sheet constituting three pieces 24 to be discarded, these three pieces are separated by cut 25 over the line of scoring 18, so that the to-be-discarded material will not interfere with tearing the board 12 along the line of scoring.

Other variants within the scope of the broad basic invention will naturally be suggested by the variants disclosed.

There will now be discussed, with reference to FIGS. 7 to 14, the reason why the backing of the prior art sometimes resists tearing, and when it does tear, the severance feathers the surface; and how the present invention remedies this situation.

FIGS. 7 and 8 illustrate an arrangement of the two scores of the prior art, which arrangement contemplates tearing by pulling up on the portion of the backing lying to the left of the scoring, and at the same time pulling down on the portion of the backing lying to the right of the scoring. The two scores are customarily arranged so that this will be the natural way to tear; and if so torn, a clean break results with the grain in the space between the two scores, as shown between scores 26 and 27 in FIG. 7. But if for any reason, with the two scores of the prior art arranged the same way, the left hand pulls up, and the right hand pulls down, the backing will resist tear, as shown in FIG. 8; and when sufficient force is applied to result in tearing, the break is more likely to occur outside of the space between the two scores, and be of considerable extent, even completely leaving the vicinity of the two scores.

If the two scores be arranged in the reverse order; or, although arranged in the same order, but approached from the opposite end of the backing board, in either such event being as shown in FIGS. 9 and 10, then the proper way to tear is down on the left and up on the right. Such a tear results in a clean break as shown in FIG. 9.

But tearing up on the left and down on the right, results in resistance to tear, as shown in FIG. 10, and finally a ragged tear.

Contrast the tearing of the three-scored present invention, as shown in FIGS. 11 to 14. Regardless whether the intermediate score is up or down, and the two other scores are down or up; and regardless which side is forced up and which is forced down; a clean break results between two of the three scores.

Thus, it will be seen that the set of three staggered parallel scores of either form of the present invention define two selective separation zones, each zone being delimited by two of said scores which lie closely enough to each other so that when tearing forces are applied to the backing-board substantially perpendicular thereto in opposite directions on each side of the set of scores, the board will sever cleanly within one of said zones, regardless which force is applied in which direction.

Although no advantage can be seen to inhere in providing more than three scores to a set, yet the addition of scores does not involve any departure from the teachings of the present invention.

The preferred embodiment of the present invention is that shown in FIGS. 1, 2, 6, 11 and 12.

Now that several embodiments of the invention have been shown and described, it is to be understood that the invention is not to be limited to the specific forms or arrangements of parts herein shown and described.

What is claimed is:

1. In a backing-board-mounted adhesive tape, the combination comprising: a backing-board composed of a thin layer of laminar concreted material having a limited susceptibility to splitting parallel to its faces; said board being severably divided into two portions coextensive of its length by a set of three substantially parallel closely spaced transverse scores, two of which are on one face of the board and the other of which lies between the two but on the other face of the board, each of said scores being approximately one-half the thickness of said board in depth, said scores defining two selective narrow separation zones, each zone being delimited by two of said scores which lie closely enough adjacent to each other, one on each face of the board, so that when tearing forces are applied to the board substantially perpendicular thereto in opposite directions on each side of the set of scores, the board will sever cleanly within one of said zones, regardless which force is applied in which direction; and a plurality of pieces of pressure-sensitive tape, in readily removable contact with one face of the board, each of said pieces overlying and being traversed by said set of scores.

2. A backing-board-mounted adhesive tape according to claim 1, wherein the single score lies on the face of the backing-board on which the tape is mounted.

3. A backing-board-mounted adhesive tape according to claim 1, wherein the single score lies on the opposite face of the backing-board from the face on which the tape is mounted.

References Cited in the file of this patent

UNITED STATES PATENTS

| | | |
|---|---|---|
| 2,372,994 | Welch | Apr. 3, 1945 |
| 2,608,341 | Eckman | Aug. 26, 1952 |
| 2,797,801 | Bishop | July 2, 1957 |
| 2,831,277 | Strachan | Apr. 22, 1958 |

UNITED STATES PATENT OFFICE
CERTIFICATE OF CORRECTION

Patent No. 3,038,597 June 12, 1962

William H. Brady, Jr.

It is hereby certified that error appears in the above numbered patent requiring correction and that the said Letters Patent should read as corrected below.

Column 3, line 52, after "strongly" insert -- restrained --; line 57, for "indentations" read -- indentation --.

Signed and sealed this 9th day of October 1962.

(SEAL)
Attest:

ERNEST W. SWIDER
Attesting Officer

DAVID L. LADD
Commissioner of Patents